No. 659,012. Patented Oct. 2, 1900.
O. V. BACHELLÉ.
AUTOMOBILE.
(Application filed Oct. 2, 1899.)
(No Model.) 3 Sheets—Sheet 2.
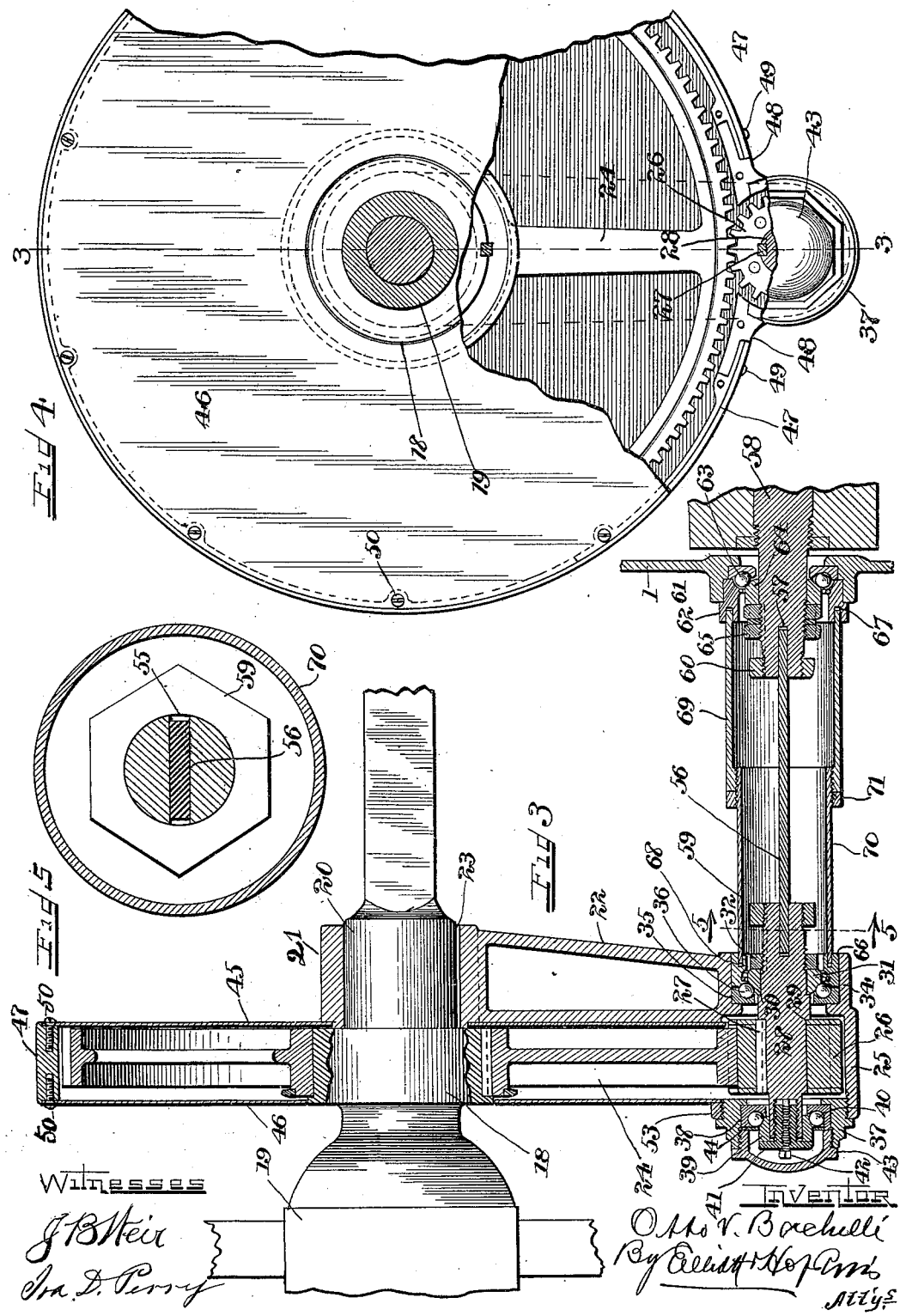

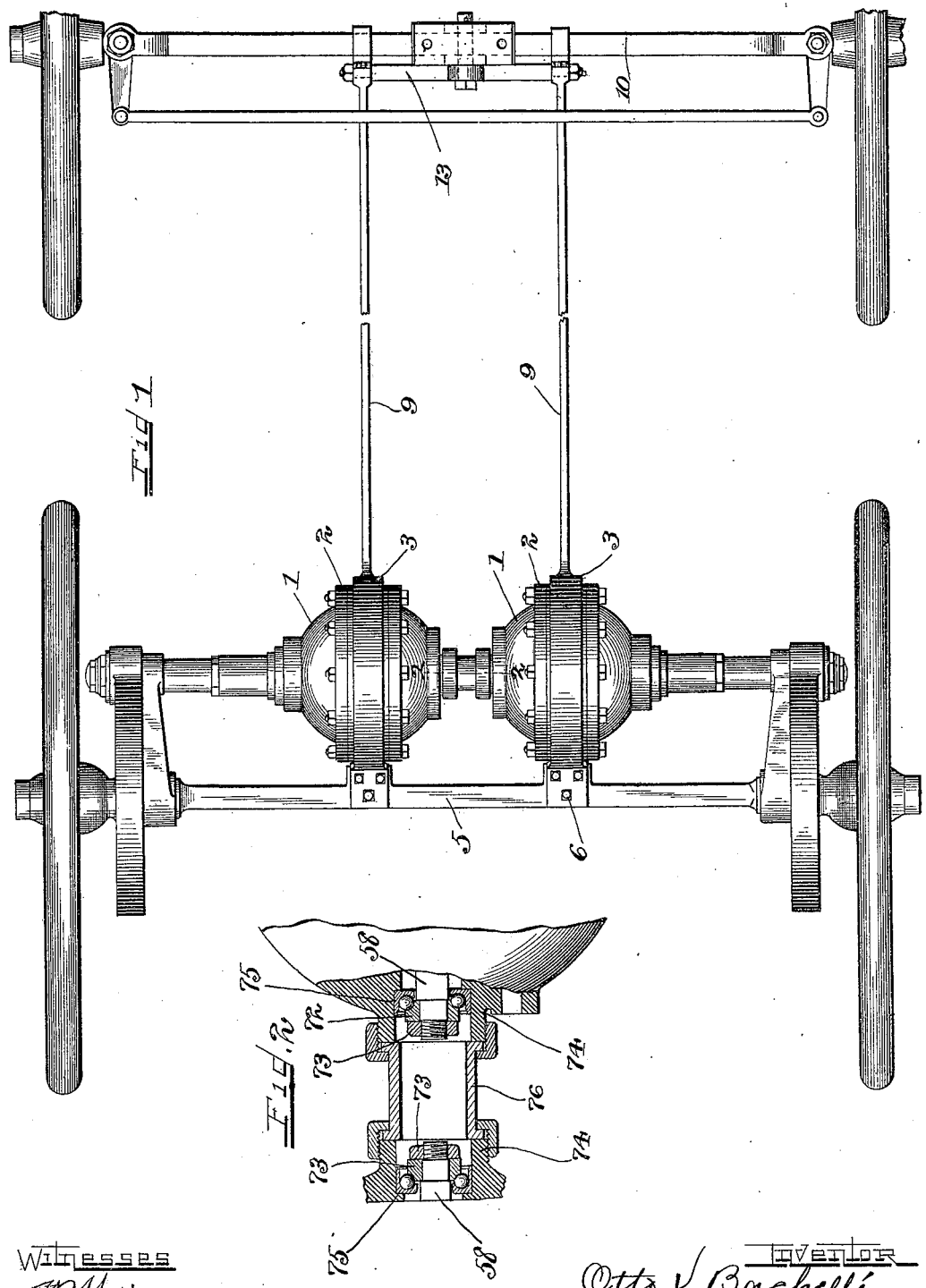

No. 659,012. Patented Oct. 2, 1900.
O. V. BACHELLÉ.
AUTOMOBILE.
(Application filed Oct. 2, 1899.)
(No Model.) 3 Sheets—Sheet 3.
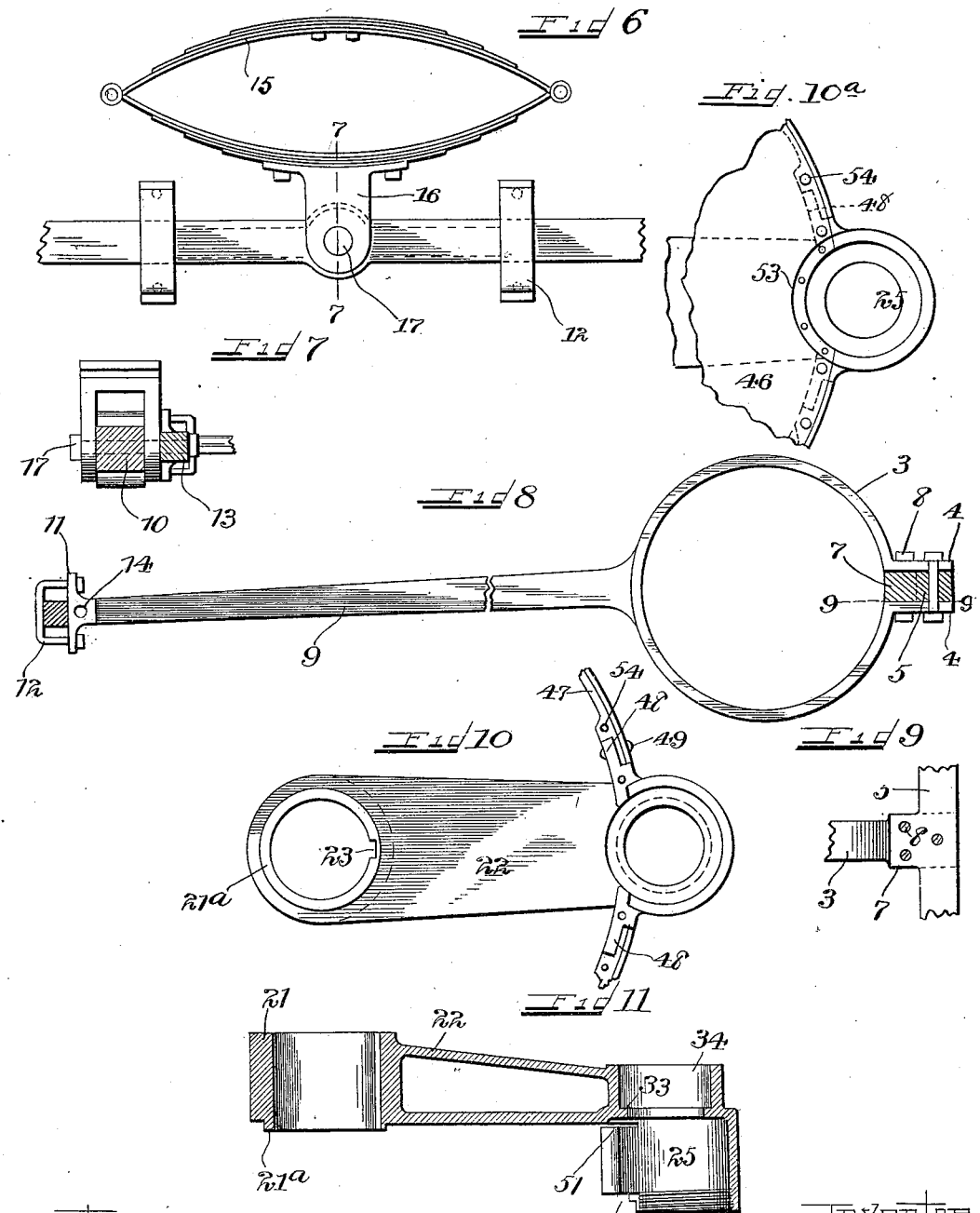
Witnesses
J B Weir
Ira D. Perry
Inventor
Otto V. Bachellé
By Elliott Hopkins
Atty

UNITED STATES PATENT OFFICE.

OTTO V. BACHELLÉ, OF CHICAGO, ILLINOIS.

AUTOMOBILE.

SPECIFICATION forming part of Letters Patent No. 659,012, dated October 2, 1900.

Application filed October 2, 1899. Serial No. 732,297. (No model.)

*To all whom it may concern:*

Be it known that I, OTTO V. BACHELLÉ, a citizen of the United States, residing at No. 1367 Sheffield avenue, in the city of Chicago, county of Cook, and State of Illinois, have invented certain new and useful Improvements in Automobiles, of which the following is a full, clear, and exact specification.

My invention relates to "automobiles," which term is herein employed as a generic designation of all motor vehicles, carriages, or velocipedes, and the improvements have reference more particularly to the means for transmitting the power of the motor to the driver or drivers, also to the frame or running-gear, to means for supporting or carrying the motor or motors, and to means for rendering the mechanism dust-proof.

My invention has for its primary object to maintain a fixed relation between the gear or other driving member on the axis of the driver and the gear or member which transmits to it power from the motor, whereby the vibration or independent movement of the motor-shaft will not disturb the proper and accurate relation or mesh of these two power-transmitting members.

More specifically stated, one object of my invention in this respect is to provide a flexible connection between the motor and the motor-pinion, whereby the angularity of the axis of the latter with relation to the axis of the gear on the driver may be maintained without variation, and therefore all lost motion and consequent noise and wear of the gears resulting from their independent vibration will be prevented.

A further object of my invention is to simplify the running-gear, whereby the same may be made to removably clamp and support one or more motors and will be rigid and strong, permitting of the ready removal of either motor independently of the other.

A further object of my invention is to hold the forward axle rigidly against horizontal oscillation while permitting it to oscillate vertically; and a still further object of my invention is to completely incase the gears and, if desired, the motor and all moving connections between the motor and gears.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

In the said drawings, Figure 1 is a plan view of an automobile running-gear equipped with my improvements. Fig. 2 is an enlarged detail section taken on the line 2 2, Fig. 1. Fig. 3 is an enlarged detail section of the gears and connected parts, taken on the line 3 3, Fig. 4. Fig. 4 is a face view thereof with a part of the outside casing-plate broken away. Fig. 5 is an enlarged detail transverse section taken on the line 5 5, Fig. 3. Fig. 6 is a front or face view of the front axle and the vehicle-body spring. Fig. 7 is a detail transverse section taken on the line 7 7, Fig. 6, on a reduced scale. Fig. 8 is a side elevation of one of the reaches for clamping and supporting the motors, the axles being shown in cross-section and the motor being removed. Fig. 9 is a detail plan section taken on the line 9 9, Fig. 8. Fig. 10 is a detail face view of the gear-supporting arm, hereinafter described; and Fig. 10$^a$ is a face view of a section of the casing, showing the bearing. Fig. 11 is a longitudinal sectional view thereof.

In illustrating my invention I have shown it in connection with electrical motive power, and I preferably employ two motors in order to compensate for the difference in speed in turning corners; but it will nevertheless be understood that the improvements are also applicable to any other form of power and to a single motor, if desired.

1 represents the motor casings or shells, which completely house the moving parts of the motors and each of which is provided with a cylindrical waist 2, made in this form for convenience in supporting each of the motors in a divided ring 3, whose ends are provided with laterally-projecting flanges 4, (see Fig. 8,) clamped on the upper and lower sides of the rear axle 5 by means of bolts 6, which also serve to grip the divided ring firmly around the waist 2 of the motor-shell, and thereby at the same time support the motor rigidly with capability of being removed. The rear axle 5, if desired, may be provided at each of the rings 3 with a flat 7 to provide for the accommodation of additional clamping-bolts 8. Each of these rings 3 constitutes a part of a reach 9, which projects horizontally to the forward axle 10, against which the end of the reach carries a buffer 11, and to this buffer is secured a vertical yoke 12, which embraces the forward side of the front axle, so as to hold the axle firmly against the buffer 11 while permitting the axle to move vertically. The forward ends of the reaches 9 are connected together by a bar 13, the buffers 11 being provided with perforations 14, through which the reduced ends of the bar 13 are passed and clamped by nuts or other suitable means, and secured to the under side of the vehicle-body spring 15 is an inverted-U-shaped saddle 16, which embraces the axle 10 and through which, as well as through the axle and bar 13, passes a horizontal bolt or pivot-pin 17, serving to support the weight of the vehicle-body while permitting the axle and bar 13 to pivot or oscillate in a vertical plane. By this means it will be seen that the front and rear axles are rigidly connected together and prevented from losing their parallelism, while the front axle is allowed free vertical oscillation, and the motors are rigidly supported, but capable of being readily removed when desired.

Formed on each end of the rear axle adjacent to a hub 18 on each of the drivers 19 is a shoulder 20, over which is forced a collar 21 of a rigid bracket-arm 22, which is sustained in a horizontal position by means of a key and key-seat 23. Keyed to the hub 18 of the driver 19 is the driver-gear 24, and formed in the forward or outer end of the bracket-arm 22 is a socket 25, in which is situated the motor-pinion 26, which meshes with the gear 24 and which may be composed of rawhide or any other suitable material, but is preferably removably secured by a key 27 or other suitable device to the pinion-shaft 28, so that when desired the pinion and also its shaft, if necessary, may be removed through the open end of the socket 25. The pinion-shaft 28 is a short shaft having a shoulder 29, against which the inner end of the pinion abuts, and a second shoulder 30, against which is abutted a bearing-cone 31, held in place by a retaining-ring 32, screwed on the inner end of the shaft 28. Seated against a shoulder 33, formed in a box 34 on the arm 22, is a ball-race 35, and between this race and cone 31 are situated balls or rollers 36, thus providing an antifriction-bearing for the inner end of the pinion-shaft 28.

In the outer end of the socket 25 is screwed or otherwise secured a bushing 37, and in this bushing is forced a ball-race 38, while surrounding the outer end of the shaft 28 is a ball-bearing cone 39, and between the cone 39 and race 38 are situated balls or rollers 40. The cone 39 is adjustably held on the end of the shaft 28 by means of a set-screw 41, screwed into the end of the shaft 28 and having a flange overlapping and bearing against the cone 39, as clearly shown in Fig. 3, so that by turning the set-screw 41 both bearings may be adjusted. The set-screw 41 is locked at its adjustment by means of another screw 42, threaded in the screw 41 and abutting against the inner end of the bore in which the screw 41 is threaded. In order that the bearings may be adjusted without removing the bushing 37, the outer side of the bushing is provided with a removable cap 43, preferably threaded therein, a ball-retaining ring 44 being forced into the bushing adjacent to the balls 40, so that the latter will not drop out of their race 38 when the cone 39 is removed. By this means it will be seen that the train of gears composed of the gear 24 and pinion 26 are rigidly fixed with relation to each other—that is to say, the angularity of their axes is held against variation—and as a consequence the wear and noise will be reduced to the minimum. It will also be seen that the pinion 26 is completely inclosed, with capability of being readily removed when desired.

In order that the gear 24 may be completely inclosed, while at the same time meshing with the pinion 26, I provide the same with a casing consisting of two side plates 45 46 and a circumferential ring 47. This ring 47 is in the form of a divided band whose ends are secured to laterally-projecting flanges 48, (see Fig. 10,) formed on the sides of the socket 25, by means of bolts or rivets 49, and the side plates 45 46 are attached to the edges of the ring 47 by screws 50 or other suitable devices, the socket 25 being provided with a slit 51, into which the edge of the inner plate 45 is situated. This inner plate 45 surrounds a flange or shoulder 21ª on the collar 21 of the arm 22 and rests flat against the arm 22, while the outer plate 46 surrounds the hub 18 and has its edge cut out to admit of the passage of the pinion 26 while resting against the flanges 48. The inner side of the socket 25 is cut away, as shown at 52, and this cut-away portion is filled by a separate piece or segment 53, which forms a continuation of the circular socket 25, this separate piece 53 being secured down against the outer plate 46 and the flanges 48 by suitable bolts or screws 54 and the interior of the socket 25 being threaded together with the segment 53 after the latter is riveted or bolted in place for the reception of the threaded bushing 37.

The inner end of the pinion-shaft 28 is provided with a cross-slot 55, which receives one end of a steel or other flexible blade 56, while the other end of such blade is similarly seated in a slot or notch 57, formed in one end of the motor-shaft 58, and over the opposed ends of these two shafts 28 58 are slipped collars 59 60, respectively, the ends of the shafts being threaded for the reception of the collars, if desired, whereby the blade 56 will be held against lateral displacement. This blade is of sufficient elasticity to permit of independent vibration or oscillation of the motor-shaft without transmitting the same to the pinion-shaft 28, thus allowing the pinion-shaft and pinion to remain rigidly fixed with relation to the gear 24, while at the same time the blade is of sufficient rigidity to transmit the motion of the motor-shaft 58 to the pinion-shaft 28. Should the vibration be in a plane with the flat blade 56, the shaft 58 would slide or turn with relation to the blade or the blade would make such a movement with relation to the shaft 28, the blade being slightly less in width than the diameter of the shafts 28 58, as better shown in Fig. 5, so as to permit the blade to move in its own plane a slight distance independently of both shafts.

Seated around the opening in the motor casing or shell 1, through which the shaft 58 passes, is a ball-race 61, and secured in the opening on the outer side of this race is a collar 62, which also embraces the balls 63 on one side, the balls being supported on a bearing-cone 64, sleeved on the shaft 58 and held adjustably in place by nuts 65, and secured in the box 34 on the arm 22 is a collar 66, which, like the collar 62, partially embraces the balls 36 on their outer side. These two collars 62 66 are provided with annular grooves or sockets 67 68, respectively, in the former of which is secured one end of a sleeve 69, while in the other is secured the outer end of a sleeve 70, and these two sleeves are telescoped together and threaded, so that by turning one sleeve with reference to the other the collars 62 66 may be forced firmly into their seats, thus completely housing the bearings of the shaft 58 and the inner bearings of the shaft 28, as well as inclosing the flexible blade 56, 71 being a lock-nut on the sleeve 70 for holding the parts against retrograde movement.

The opposite end of the motor-shaft 58 to that presented in Fig. 3 is provided with a cone 72 and lock-nut 73, and forced into a nipple 74 on the opposite side of the motor-casing is a ball-race 75, thus providing a bearing for this end of the shaft. When but one motor is employed, the nipples 74 may be closed by any suitable cap; but when two motors are employed I prefer to couple the nipples 74 together by means of a union 76, which will add rigidity to the structure.

Having thus described my invention, what I claim as new therein, and desire to secure by Letters Patent, is—

1. An automobile having in combination a motor, a gear, a driver driven by said gear, one of the two first said parts having a slotted shaft and a flexible blade secured at one end to the other of the two first said parts and having its other end held in said slotted shaft, substantially as set forth.

2. An automobile having in combination a motor, a driver, a train of gears one of which is connected with for driving said driver and a flexible blade loosely connecting the other of said gears with said motor, substantially as set forth.

3. An automobile having in combination a motor, a driver, a train of gears one of which is connected with for driving said driver, a shaft to which the other of said gears is secured and a flexible blade having its ends loosely connected with said shaft and motor respectively, substantially as set forth.

4. An automobile having in combination a motor, a driver, a train of gears one of which is connected with for driving said driver, a shaft upon which the other of said gears is mounted having a slotted end, a flexible blade having one end secured to the motor and the other end fitting in said slotted shaft and means for holding said blade in place in said slot, substantially as set forth.

5. An automobile having in combination the pinion-shaft, the pinion on said shaft, a socket in which said pinion is located having an open end of sufficient size to admit the pinion, a removable portion closing said open end, antifriction-bearing devices carried in said removable portion and coöperating with said pinion-shaft, a motor for driving said pinion and a driver geared to said pinion-shaft, substantially as set forth.

6. An automobile having in combination the pinion-shaft, the pinion thereon, a socket in which said pinion is housed having an open end of sufficient size to admit the pinion, a bushing closing said open end, antifriction-bearing devices carried in said bushing, means for adjusting said antifriction-bearing devices and a cap secured in said bushing and inclosing the last said means, a motor for driving said pinion-shaft and a driver geared to said pinion, substantially as set forth.

7. An automobile having in combination an axle, a driver thereon, a bracket-arm secured to said axle, a gear secured to said driver adjacent to said bracket-arm, a pinion mounted in said bracket-arm and partially inclosed thereby, a gear-casing incasing said gear and secured to said bracket-arm, a removable portion secured to said bracket-arm, and coöperating therewith for completely inclosing said pinion and a motor connected with said pinion, substantially as set forth.

8. An automobile having in combination an axle having a shoulder thereon, a driver having its hub journaled on said axle contiguous to said shoulder, a bracket-arm rigidly secured to said shoulder at one end and having a pinion-socket at the other end, a gear secured to said driver, a ring secured to said pinion-socket and surrounding said gear, a plate secured to one side of said ring between said bracket-arm and gear, a plate secured to the other side of said ring and surrounding said hub, a pinion located in said socket and meshing with said gear, and means for closing said socket, substantially as set forth.

9. An automobile having in combination an axle, a driver on said axle, a gear secured to said driver, a rigid arm secured to the axle adjacent to said gear and having a pinion-socket in one end whose side is partially cut away and provided with laterally-projecting flanges, a ring secured to said flanges and surrounding said gear, a removable segment secured to said socket and flanges and completing the cut-away portion of said socket, a plate carried by said ring on each side of said gear, a removable portion located in and closing the end of said socket, and a pinion located in said socket and journaled in said removable portion and meshing with said gear, substantially as set forth.

10. An automobile having in combination a motor, a driver, a motor-casing, a bracket-arm supporting one of said gears, a flexible connection between the motor and one of said gears, and a two-part telescopic sleeve incasing said flexible connection and extending between the arm and the motor-casing, substantially as set forth.

11. An automobile having in combination an axle, a motor, a reach having a divided band clamped to said axle and also embracing and clamping the motor, substantially as set forth.

12. An automobile having in combination a motor frame or casing, an axle, and a reach having a divided band embracing and clamping said motor-frame, the ends of said divided band being bolted to the axle, substantially as set forth.

13. An automobile having in combination the front and rear axles, a pair of reaches secured to the rear axle and abutting against the front axle and having vertical yokes embracing the front axle, and a bar connecting the forward ends of said reaches together; substantially as set forth.

14. An automobile having in combination a motor, a driver, a train of gears one of which is connected with for driving said driver, a shaft upon which the other of said gears is mounted having its end transversely slotted and screw-threaded, a flexible blade having one end secured to the motor and the other end fitting in said slotted shaft and a collar screwed on the end of said shaft over and embracing the inserted end of said blade, substantially as set forth.

15. An automobile having in combination the front and rear axles, a pair of reaches rigidly secured to the rear axle and abutting against the front axle, a yoke on the forward end of each reach embracing the front axle for holding it against horizontal but permitting of vertical movement, a bar connecting the forward ends of said reaches together, the forward spring of the vehicle-body and a pivotal connection between said spring, and said bar and axle having a horizontal axis, substantially as set forth.

OTTO V. BACHELLÉ.

Witnesses:
EDNA B. JOHNSON,
F. A. HOPKINS.